United States Patent [19]

Hoppie

[11] 4,305,489
[45] Dec. 15, 1981

[54] VARIABLE RATIO REGENERATIVE BRAKING DEVICE

[75] Inventor: Lyle O. Hoppie, Birmingham, Mich.
[73] Assignee: Eaton Corporation, Cleveland, Ohio
[21] Appl. No.: 100,783
[22] Filed: Dec. 5, 1979
[51] Int. Cl.³ .................. B60K 41/28; B60K 41/24; F16D 25/10
[52] U.S. Cl. .................. 192/4 A; 192/0.094; 192/13 R; 192/48.9; 192/87.14; 74/572; 474/17; 185/9
[58] Field of Search .................. 192/4 A, 48.1, 48.8, 192/48.9, 87.14, 3.51, 13 R, 0.098, 0.094, 3 TR, 12 R; 74/689, 751, 572; 474/17; 185/9, 10, 11, 17, 40 H; 180/165

[56] References Cited

U.S. PATENT DOCUMENTS

| | | |
|---|---|---|
| 1,030,051 | 6/1912 | Brundege . |
| 2,137,574 | 11/1938 | Kromer . |
| 3,126,070 | 3/1964 | Hayek . |
| 3,641,843 | 2/1972 | Lemmens .................. 74/689 X |
| 4,110,982 | 9/1978 | Regar .................. 74/572 X |
| 4,159,042 | 6/1979 | Jayner .................. 185/40 H |

*Primary Examiner*—George H. Krizmanich
*Attorney, Agent, or Firm*—R. J. McCloskey; P. S. Rulon

[57] ABSTRACT

Disclosed is a regenerative braking device (10) for an automotive vehicle. The device includes an energy storage assembly (12) having a plurality of rubber rollers (26, 28) mounted for rotation between an input shaft (36) and an output shaft (42), clutches (38, 46) and brakes (40, 48) associated with each shaft, and a continuously variable transmission (22) connectable to a vehicle drivetrain and to the input and output shafts by the respective clutches. The rubber rollers are torsionally stressed to accumulate energy from the vehicle when the input shaft is clutched to the transmission while the brake on the output shaft is applied, and are torsionally relaxed to deliver energy to the vehicle when the output shaft is clutched to the transmission while the brake on the input shaft is applied. The transmission ratio is varied to control the rate of energy accumulation and delivery for a given rotational speed of the vehicle drivetrain.

16 Claims, 1 Drawing Figure

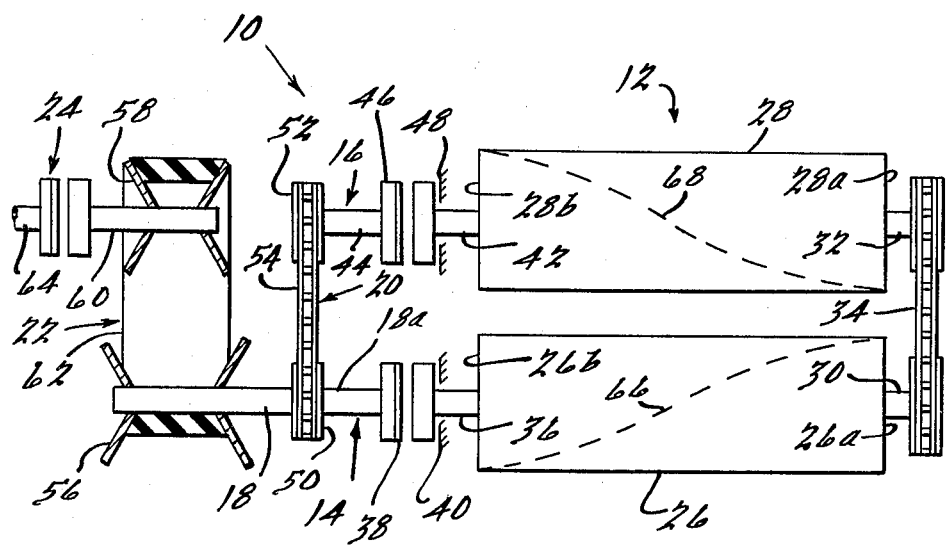

VARIABLE RATIO REGENERATIVE BRAKING DEVICE

CROSS-REFERENCE TO RELATED APPLICATION

This application is related to co-pending U.S. patent application Ser. No. 944,442, filed Sept. 21, 1978 and to U.S. patent application Ser. No. 095,901, filed Nov. 11, 1979. Both applications are assigned to the assignee of this application and both are incorporated herein by reference.

FIELD OF THE INVENTION

The invention relates to regenerative braking and more specifically to regenerative braking of an automotive vehicle.

BACKGROUND OF THE INVENTION

Automotive regenerative braking devices having energy storage assemblies employing metal springs are well known. In general such devices have been manually operated to effect vehicle braking by converting vehicle motion (kinetic energy) into resiliently stored potential energy and manually operated to effect vehicle acceleration with the stored energy. The storage assemblies employing metal springs have been unduly bulky and/or heavy. Further, the amount of braking and driving torque provided by such assemblies has not been readily controllable.

In co-pending U.S. patent application Ser. No. 944,442, filed Sept. 21, 1978 and now U.S. Pat. No. 4,246,988, applicant discloses a regenerative braking system having a control system for modulating braking and driving torques provided by a storage assembly having torsionally stressed rubber rollers. While this control system is an effective way to control braking and acceleration torques, it has the disadvantage of requiring rapid on-off control of clutches and brakes under relatively high torque loads and substantial rotational speed differences.

SUMMARY OF THE INVENTION

An object of this invention is to provide a regenerative braking device wherein braking and driving torques provided by the device are controlled without the need of rapid on-off control of clutches and/or brakes.

According to a feature of the invention, the regenerative braking device includes an energy storage assembly, a drive shaft mounted for rotation, input and output clutches selectively operative to drivingly connect the drive shaft with the energy storage assembly, and variable ratio transmission drivingly interposed between the drive shaft and the vehicle drivetrain.

BRIEF DESCRIPTION OF THE DRAWING

The drawing schematically illustrates a regenerative braking device adapted to be connected to a drivetrain of an unshown vehicle.

Certain terminology referring to the proposed use of the regenerative braking device in an automotive vheicle and motion and location of components of the device in the drawing will be used in the following description. This terminology is for convenience in describing the disclosed embodiment and shall not be considered limiting unless explicitly used in the appended claims.

DETAILED DESCRIPTION OF THE DRAWING

The drawing schematically illustrates a regenerative braking device 10 including an energy storage assembly 12, an energy input assembly 14, an energy output assembly 16, a drive shaft means or common power path 18 connected to assemblies 14 and 16 by a chain drive assembly 20, a continuously variable transmission 22, and an input/output clutch assembly 24.

Energy storage assembly 12 includes a plurality of rotatably mounted rubber bars or elastic rollers, herein rollers 26 and 28, fixed at their right hand ends 26a and 28a to shafts 30 and 32. Shafts 30 and 32 are drivingly interconnected by a continuous chain or belt 34 which drives the shafts in a one-to-one speed ratio. The rollers are shown connected in series; however, it should be clear that the rollers can be connected in parallel.

Input assembly 14, which defines an input power path to the energy storage assembly, includes a shaft 36 fixed at its right hand end to the left hand end or input portion 26b of roller 26, a shaft portion 18a of a drive shaft 18, an input clutch 38 and an input brake 40. Clutch 38 is applied to drivingly interconnect shafts 36 and 18, and brake 40 is applied to prevent rotation of end portion 26b of roller 26. When clutch 38 is applied, brake 40 is adapted to be released and vice versa.

Output assembly 16, which defines an output power path for energy storage assembly 12, includes a shaft 42 fixed at its right hand end to the left hand end or output portion 28b of roller 28, a shaft 44 in constant driving relation with drive shaft 18 and shaft portion 18a by drive assembly 20, an output clutch 46, and an output brake 48. Clutch 46 is applied to drivingly interconnect shafts 42 and 44, and brake 48 is applied to prevent rotation of end portion 28b of roller 28. When clutch 46 is applied, brake 48 is released and vice versa. Further, when input clutch 38 is applied, output clutch 46 is released and output brake 48 is applied; when output clutch 46 is applied, input clutch 38 is released and input brake 40 is applied.

Drive assembly 20 includes chain drive sprockets 50 and 52 fixed to shafts 18 and 44, respectively, and a continuous chain 54. It should be clear that drive assembly 20 can be replaced by any of several well known devices to drivingly interconnect shafts 18 and 44, e.g., a V-belt, gears, etc.

Variable ratio transmission 22 includes a variable diameter sheave or pulley 56 fixed for rotation with shaft 18, a variable diameter sheave or pulley 58 fixed for rotation with shaft 60, and a continuous V-belt 62. The diameters of pulleys 56 and 58 are readily varied by moving one or both of the halves of one pulley together while separating the halves of the other pulley. Transmission 22 is a well known species of transmissions which are known as continuously variable transmissions. Transmission 22 may be any one of several types of continuously variable transmissions or it may be a discrete or step ratio type transmission.

Clutch 24 may be a conventional friction clutch connected on one side to a partially shown shaft 64 which is drivingly connected to an unshown drivetrain of a motor vehicle or any machine having a mass to be braked and accelerated. The other side of the clutch is connected directly to pulley 58 by shaft 60. Clutch 24 may be dispensed with and shaft 60 may be continuously driven by the vehicle drivetrain. However, to minimize losses and wear of the transmission, clutch 24 is preferred. Clutch 24 may be unapplied during steady state vehicle operation and applied in response to initiation of vehicle braking or acceleration.

Looking now at the operation of device 10, shaft 64 when viewed for the left in the drawing, rotates clockwise when the vehicle is moving. During steady state operation of the vehicle, clutches 24, 38, and 46 are unapplied or released and brakes 40 and 48 are applied. Hence, device 10 is disconnected from the vehicle drivetrain by clutch 24, input and output power paths 14 and 16 are disconnected by clutches 38 and 46, and any energy in the storage assembly is locked therein by brakes 40 and 48. During vehicle braking, clutch 46 and brake 48 remain in their steady state positions while clutches 24 and 38 are applied and brake 40 is released, thereby effecting a driving connection for shaft 64 into the storage assembly via clutch 24, shaft 60, transmission 22, shaft 18, clutch 38, and shaft 36. This driving connection rotates shaft 36 clockwise to effect a flow of energy into the storage assembly from the vehicle drivetrain at a rate determined by the rotational speed of shaft 64 and the speed ratio of transmission 22. The clockwise rotation of shaft 36 twists or torsionally stresses rubber rollers 26 and 28 as depicted by phantom lines 66 and 68. As the torsional stress increases the storage assembly accumulates energy from the vehicle drivetrain, thereby slowing or braking the vehicle. The braking rate and the flow of energy from the drivetrain to the energy storage assembly is decreased by decreasing the diameter of pulley 58 relative to pulley 56. Conversely, the braking rate and flow of energy from the drivetrain is increased by increasing the diameter of pulley 58 relative to pulley 56. The torsional stress in the rollers applies a counterclockwise torque to shaft 36 and a clockwise torque to shaft 42.

During vehicle acceleration, clutch 38 and brake 40 remain in their steady state positions while clutches 24 and 46 are applied and brake 48 is released, thereby effecting a driving connection from the storage assembly to shaft 64 via shaft 42, clutch 46, shaft 44, chain drive assembly 20, shaft 18, transmission 22, shaft 60, and clutch 24. This driving connection rotates shaft 42 clockwise to effect a flow of energy back into the vehicle drivetrain from the energy storage assembly at a rate determined by the rotational speed of shaft 64 and the speed ratio of transmission 22. The clockwise rotation of shaft 42 relaxes the torsional stresses in the rubber rollers to effect a delivery of accumulated energy back to the vehicle drivetrain, thereby accelerating or driving the vehicle. The acceleration and the flow of energy from the storage assembly is decreased by increasing the diameter of pulley 56 relative to pulley 58. Conversely, the acceleration and the flow of energy from the storage assembly is increased by decreasing the diameter of pulley 56 relative to pulley 58.

From the foregoing, it should be clear that, the rate of energy flow into and from the energy storage assembly is readily controlled by varying the speed ratio of transmission 22. The speed ratio of transmission 22 may also be used to minimize or decrease impulse forces acting on components of the regenerative braking device and the vehicle drivetrain as a deceleration or an acceleration is initiated, thereby decreasing destructive wear and tear of these components. For example, when the vehicle is operating in a steady state mode, clutch 24 can be released as previously described, and clutches 38 and 46 can both be applied while brakes 40 and 48 are both released, thereby effecting a balanced force loop defined by energy storage assembly 12, input and output power paths 14 and 16, and chain drive assembly 20. This in effect leaves the components of the balanced force loop and the transmission in a free wheeling state regardless of the speed ratio of the transmission. Hence, if pulley 56 is as large as it can be relative to pulley 58, when clutch 24 is applied, a relatively low transient torque will bring the transmission and the components of the balanced force loop up to speed. If clutch 46 is then released and brake 48 applied with pulleys 56 and 58 in the same positions, deceleration at the minimum rate will result. Thereafter, deceleration can be increased as desired by decreasing the diameter of pulley 58 relative to pulley 56.

The preferred embodiment of the invention has been disclosed for illustrative purposes. Many variations and modifications of the disclosed embodiment are believed to be within the spirit of the invention. The following claims are intended to cover the inventive portions of the disclosed embodiment and variations and modifications within the spirit of the invention.

What is claimed:

1. A regenerative braking device for braking and driving a mass, said device comprising:
   means resiliently stressed and unstressed to effect braking and driving of the mass respectively;
   a common power path mounted for rotation;
   input and output power paths mounted for rotation and interposed between said common power path and said resilient means and including, and means selectively operative to drivingly connect said common power path with said resilient means via said input power path to effect braking of the mass and via said output power path to effect driving of said mass;
   means adapted to be rotationally connected to the mass; and
   a variable ratio transmission drivingly interposed between the common power path and adapted means.

2. The device of claim 1, wherein said variable ratio transmission is a continuously variable transmission.

3. The device of claim 1, wherein said variable ratio transmission is a variable sheave transmission.

4. The device of claims 1, 2 or 3, wherein said resilient means includes:
   at least one elastic member mounted for rotation and drivingly connected at opposite ends to said input and output power paths by said means selectively.

5. The device of claims 1, 2 or 3, wherein said resilient means includes:
   at least one elastomeric roller mounted for rotation and having an input end and an output end respectively connected to said input and output power paths by said means selectively, said roller torsionally stressed to accumulate energy from said mass when connected to said input power path and torsionally relaxed to deliver accumulated energy to said mass when connected to said output power path.

6. The device of claim 5, wherein said means selectively includes:
   clutch means selectively operative to drivingly connect the common path with said rollers via the input and output paths and brake means selectively operative to prevent rotation of either end of said rollers.

7. A regenerative braking device for braking and driving a vehicle said device comprising:
an energy storage assembly including resilient means mounted for rotation and having input and output portions, said resilient means torsionally stressed to accumulate energy from said vehicle, and said resilient means torsionally relaxed to deliver energy to said vehicle in response to rotation of said output portion;
drive means mounted for rotation;
input and output clutch means respectively operative when applied to drivingly connect said drive means with said input and output portions;
input and output brake means respectively operative when applied to prevent rotation of said input and output portions;
means adapted to be rotationally driven by the vehicle; and
a continuously variable transmission drivingly interposed between said drive means and said adapted means.

8. A regenerative braking device for braking and driving a mass, said device comprising:
an energy storage assembly:
a common power path mounted for rotation;
means adapted to rotatably connect one end of said common path with said mass; and
input and output power paths mounted for rotation and including means selectively operative to drivingly connect the other end of said common path with said storage assembly via said input and output paths at the same time to effect a non-braking and a non-driving connection between said mass and storage assembly, via only said input path to effect braking of said mass, and via only said output path to effect driving of said mass.

9. The device of claim 8, further including:
a variable ratio transmission drivingly interposed between said common path and said means adapted.

10. The device of claim 8, further including:
a continuously variable transmission drivingly interposed between said common path and said means adapted.

11. The device of claim 8, further including:
a variable sheave transmission drivingly interposed between said common path and said adapted means.

12. The device of claims 8, 9, 10, or 11, wherein said energy storage assembly includes:
at least one elastic member mounted for rotation and drivingly connected at opposite ends to said input and output power paths by said clutch means.

13. The device of claims 8, 9, 10, or 11, wherein said energy storage assembly includes:
at least one elastomeric roller mounted for rotation and having an input end and an output end respectively connected to said input and output power paths by said clutch means, said roller torsionally stressed to accumulate energy from said mass when connected to said input power path and torsionally relaxed to deliver accumulated energy to said mass when connected to said output power path.

14. The device of claim 13, wherein said selective means includes:
clutch means selectively operative to drivingly connect the common path with said rollers via the input and output paths and brake means selectively operative to prevent rotation of either end of said rollers.

15. The device of claim 8, 9, 10, or 11, wherein said means selectively includes:
a clutch disposed in each of said input and output paths.

16. The device of claim 15, wherein said means selectively includes:
a brake disposed in each of said input and output paths.

* * * * *

UNITED STATES PATENT AND TRADEMARK OFFICE
CERTIFICATE OF CORRECTION

PATENT NO. : 4,305,489
DATED : December 15, 1981
INVENTOR(S) : Lyle O. Hoppie

It is certified that error appears in the above—identified patent and that said Letters Patent are hereby corrected as shown below:

In column one, line 13, immediately preceeding the heading "FIELD OF THE INVENTION", insert:

-- The Government has rights in this invention pursuant to Subcontract No. 2617509 under Contract No. W-7405-ENG-48, awarded by the U.S. Department of Energy. --

Signed and Sealed this

Third Day of May 1983

[SEAL]

Attest:

GERALD J. MOSSINGHOFF

Attesting Officer

Commissioner of Patents and Trademarks